J. WELBY.
HAND TRUCK.
APPLICATION FILED APR. 29, 1920.
1,364,535.
Patented Jan. 4, 1921.
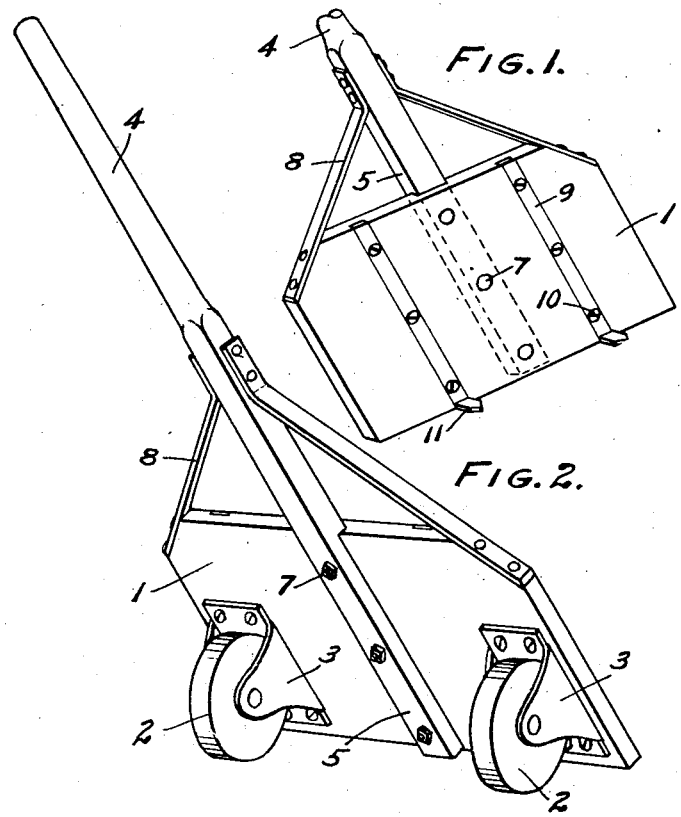
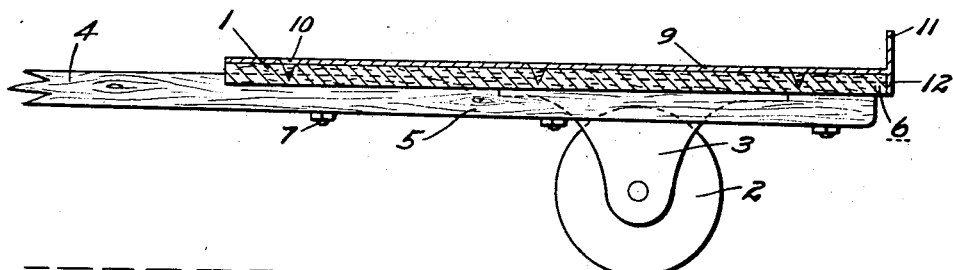
INVENTOR
JAMES WELBY
BY
Hazard & Miller
ATTORNEYS.

UNITED STATES PATENT OFFICE.

JAMES WELBY, OF LOS ANGELES, CALIFORNIA.

HAND-TRUCK.

1,364,535.  Specification of Letters Patent.  Patented Jan. 4, 1921.

Application filed April 29, 1920. Serial No. 377,516.

*To all whom it may concern:*

Be it known that I, JAMES WELBY, a citizen of the United States, residing at Los Angeles, in the county of Los Angeles and State of California, have invented new and useful Improvements in Hand-Trucks, of which the following is a specification.

This invention is a hand truck and has for its object the provision of a strong and durable truck of simplified and inexpensive construction. Further objects of the invention will be readily understood from the following description of the drawings, in which—

Figure 1 is a front perspective view of the truck with the handle broken away.

Fig. 2 is a rear perspective view of the truck, and

Fig. 3 is a longitudinal section through the truck.

The improved truck is shown as comprising a base 1, preferably formed of wood and having casters 2 journaled in brackets 3 secured to the under side of the base adjacent the front edge thereof. A handle 4 projects rearwardly from the rear edge of the base and is preferably secured to the base by providing an elongated tongue 5 at the end of the handle which extends across the base and is received in a groove formed in the lower side thereof. The tongue and groove connection for the handle with the truck base is preferably arranged approximately midway between the casters of the truck. The elongated tongue 5 preferably tapers in thickness and the groove in the base of the truck, which is shown at 6, also tapers in its depth, as shown in Fig. 3. By this arrangement the tongue and the handle may be inserted in the groove of the base of the truck and adjusted longitudinally in the groove to provide a tight joint between the truck base and the handle. The handle may be secured in position by bolts 7 extending through the truck base and the tongue 5. Braces 8 are preferably provided between the sides of the truck base and the sides of the handle 4. Wearing irons 9, preferably extend across the upper side of the truck base and may be embedded in the truck base and secured in position by screws 10. The front ends of the wearing irons preferably form upwardly projecting prongs 11 arranged to engage beneath the article to be carried upon the truck, and these prongs 11 are preferably provided with downwardly projecting extensions 12 received against the front edge of the truck base.

It will be obvious that various changes may be made in the construction as thus described without departing from the spirit of the invention.

What is claimed is:

A hand truck comprising a base, wheels upon said base, a handle projecting rearwardly from said base, and wearing irons extending across said base having upwardly projecting prongs at their front ends and downwardly projecting extensions received against the front end of said base.

In testimony whereof I have signed my name to this specification.

JAMES WELBY.